United States Patent
Wu et al.

(10) Patent No.: US 11,278,851 B2
(45) Date of Patent: Mar. 22, 2022

(54) SPARKLING WATER MAKER CAPABLE OF AUTOMATICALLY CONTROLLING GAS INFLOW

(71) Applicant: Zhejiang Hongfeng Precision Co., Ltd., Yongkang (CN)

(72) Inventors: Xiaohua Wu, Yongkang (CN); Ping Wang, Yongkang (CN)

(73) Assignee: Zhejiang Hongfeng Precision Co., Ltd., Yongkang (CN)

( * ) Notice: Subject to any disclaimer, the term of this patent is extended or adjusted under 35 U.S.C. 154(b) by 0 days.

(21) Appl. No.: 16/929,106

(22) Filed: Jul. 15, 2020

(65) Prior Publication Data

US 2021/0220781 A1  Jul. 22, 2021

(30) Foreign Application Priority Data

Jan. 20, 2020  (CN) .......................... 202010063157.4

(51) Int. Cl.
*B01F 3/04*  (2006.01)

(52) U.S. Cl.
CPC ...... *B01F 3/04794* (2013.01); *B01F 3/04815* (2013.01); *B01F 2003/049* (2013.01); *B01F 2003/04822* (2013.01); *B01F 2215/0022* (2013.01)

(58) Field of Classification Search
CPC .......................... B01F 3/04794; B01F 3/04787
See application file for complete search history.

(56) References Cited

U.S. PATENT DOCUMENTS 6,832,634 B1 * 12/2004 Chantalat ............ B01F 3/04794
                                                        141/64
10,773,944 B2 * 9/2020 Maier .................... G06Q 30/02

* cited by examiner

*Primary Examiner* — Robert A Hopkins

(57) ABSTRACT

A sparkling water maker capable of automatically controlling gas inflow includes a gas cylinder, a gas cylinder connector mounted on the gas cylinder, a bottle, and a bottle connector mounted on the bottle. A gas guide tube is connected between the gas cylinder connector and the bottle connector. A compressed gas in the gas cylinder is delivered to the bottle through the gas guide tube. The gas guide tube includes a first gas guide tube connected to the gas cylinder connector and a second gas guide tube connected to the bottle connector. A valve is connected between the first gas guide tube and the second gas guide tube. The valve is configured to block a flow passage between the first gas guide tube and the second gas guide tube.

7 Claims, 4 Drawing Sheets

SPARKLING WATER MAKER CAPABLE OF AUTOMATICALLY CONTROLLING GAS INFLOW

BACKGROUND OF THE INVENTION

1. Field of the Invention

The present invention relates to a sparkling water maker, and more particularly to a sparkling water maker capable of automatically controlling gas inflow.

2. Description of the Prior Art

Carbonated water (also known as soda water, sparkling water, water with gas) is water containing dissolved carbon dioxide gas. Sparkling water has a refreshing flavor and can provide a variety of functions, such as suppressing appetite, avoiding constipation, blocking the absorption of sugar and fat, and neutralizing the acidity in the body. Therefore, it is loved by more and more users. A sparkling water maker is an apparatus for producing sparkling water, which belongs to the field of small household appliances.

The working principle of the sparkling water maker is described below. When in use, the valve of the carbon dioxide gas cylinder is opened through a press lever and an ejector pin. The compressed gas in the carbon dioxide gas cylinder is delivered to a gas injection tube through a gas guide tube. The compressed gas is released from the spout at the lower end of the gas injection tube into the purified water or other beverages in the bottle, thereby producing sparkling water.

Sparkling water makers on the market generally have a pressure relief function. Generally, a pressure relief valve is provided to communicate with the bottle through a gas tube. In use, the carbon dioxide gas cylinder continuously delivers the compressed carbon dioxide gas to the bottle. When the pressure in the bottle reaches a certain value, the excess gas in the bottle is exhausted out of the sparkling water maker through the pressure relief valve, so as to ensure that the gas pressure in the bottle will not be too high. This can prevent the solution in the bottle from spraying out, or the gas pressure in the bottle is too high to cause safety hazards. Although this structure avoids the above situation, it is still impossible to control the time for performing carbonation. When the time for performing carbonation is too long, it is easy to cause a waste of carbon dioxide gas in the gas cylinder, increasing the cost.

SUMMARY OF THE INVENTION

In view of the shortcomings of the prior art, the primary object of the present invention is to provide a sparkling water maker capable of automatically controlling gas inflow. When the gas pressure in a bottle reaches a certain value, the gas passage of carbon dioxide gas can be automatically closed, so that the solution in the bottle has saturated carbon dioxide and it can avoid a waste of gas. The operation is convenient, safe and reliable, which ensures the flavor of sparkling water and saves the cost.

In order to achieve the above object, the present invention adopts the following technical solutions.

A sparkling water maker comprises a gas cylinder, a gas cylinder connector mounted on the gas cylinder, a bottle, and a bottle connector mounted on the bottle. A gas guide tube is connected between the gas cylinder connector and the bottle connector. A compressed gas in the gas cylinder is delivered to the bottle through the gas guide tube. The gas guide tube includes a first gas guide tube connected to the gas cylinder connector and a second gas guide tube connected to the bottle connector. A valve is connected between the first gas guide tube and the second gas guide tube. The valve is configured to block a flow passage between the first gas guide tube and the second gas guide tube.

Preferably, the valve has a plurality of openings connected to the first gas guide tube, the second gas guide tube, and one end of a first pressure relief tube, respectively. Another end of the first pressure relief tube is connected to the bottle connector and is in communication with the bottle. The valve has a chamber therein and a movable member that is movable in the chamber. The movable member is configured to block the first gas guide tube or the first pressure relief tube. When the pressure at an outlet of the first gas guide tube is greater than the pressure at an outlet of the first pressure relief tube, the movable member blocks the first pressure relief tube, so that the sparkling water maker can perform carbonation. When the gas in the bottle is saturated and the pressure at the outlet of the first pressure relief tube is greater than the pressure at the outlet of the first gas guide tube, the movable member blocks the first gas guide tube, so that the sparkling water maker cannot continue to perform carbonation.

Preferably, the valve further includes a first passage and a second passage. The first passage and the second passage communicate with the chamber. The first passage is connected to the first gas guide tube and the second gas guide tube. The second passage is connected to the first pressure relief tube. The movable member is configured to block the first passage or the second passage. When the pressure in the first passage is greater than the pressure in the second passage, the movable member blocks the second passage under pressure. When the pressure in the second passage is greater than the pressure in the first passage, the movable member blocks the first passage under pressure.

Preferably, the valve is further connected with a second pressure relief tube. One end of the second pressure relief tube is connected to the second passage. Another end of the second pressure relief tube is connected to a pressure relief valve. When the pressure in the second pressure relief tube is greater than a preset pressure of the pressure relief valve, the pressure relief valve is opened to exhaust the gas to an outside of the sparkling water maker.

Preferably, the movable member is a piston. Two ends of the piston have different cross-sectional areas. The cross-sectional area of one end close to the first gas guide tube of the piston is less than the cross-sectional area of the other end close to the second gas guide tube of the piston.

Preferably, the piston includes a round block and a round rod. The round rod is close to the first gas guide tube. The round block is close to the first pressure relief tube. The round rod has a cross-sectional area less than that of the round block.

Preferably, a sealing block is provided at one end of the round rod. Sealing rings are provided on the round rod and the round block, respectively. The sealing rings are in interference fit with an inner wall of the chamber.

Preferably, a compression spring is provided in the chamber. Two ends of the compression spring abut against the round block and an end face of the chamber close to the first gas guide tube, respectively. In an initial state, the compression spring drives the piston to move toward the second gas guide tube.

The beneficial effects of the present invention are described below. When the gas pressure in a bottle reaches a certain value, the intake passage of carbon dioxide gas can be automatically closed by the valve, so that the solution in the bottle has saturated carbon dioxide and it can avoid a waste of gas. The operation is convenient, safe and reliable, which ensures the flavor of sparkling water and saves the cost.

BRIEF DESCRIPTION OF THE DRAWINGS

Embodiments of the present invention will now be described, by way of example only, with reference to the accompanying drawings.

DETAILED DESCRIPTION OF THE PREFERRED EMBODIMENTS

Figure 1:
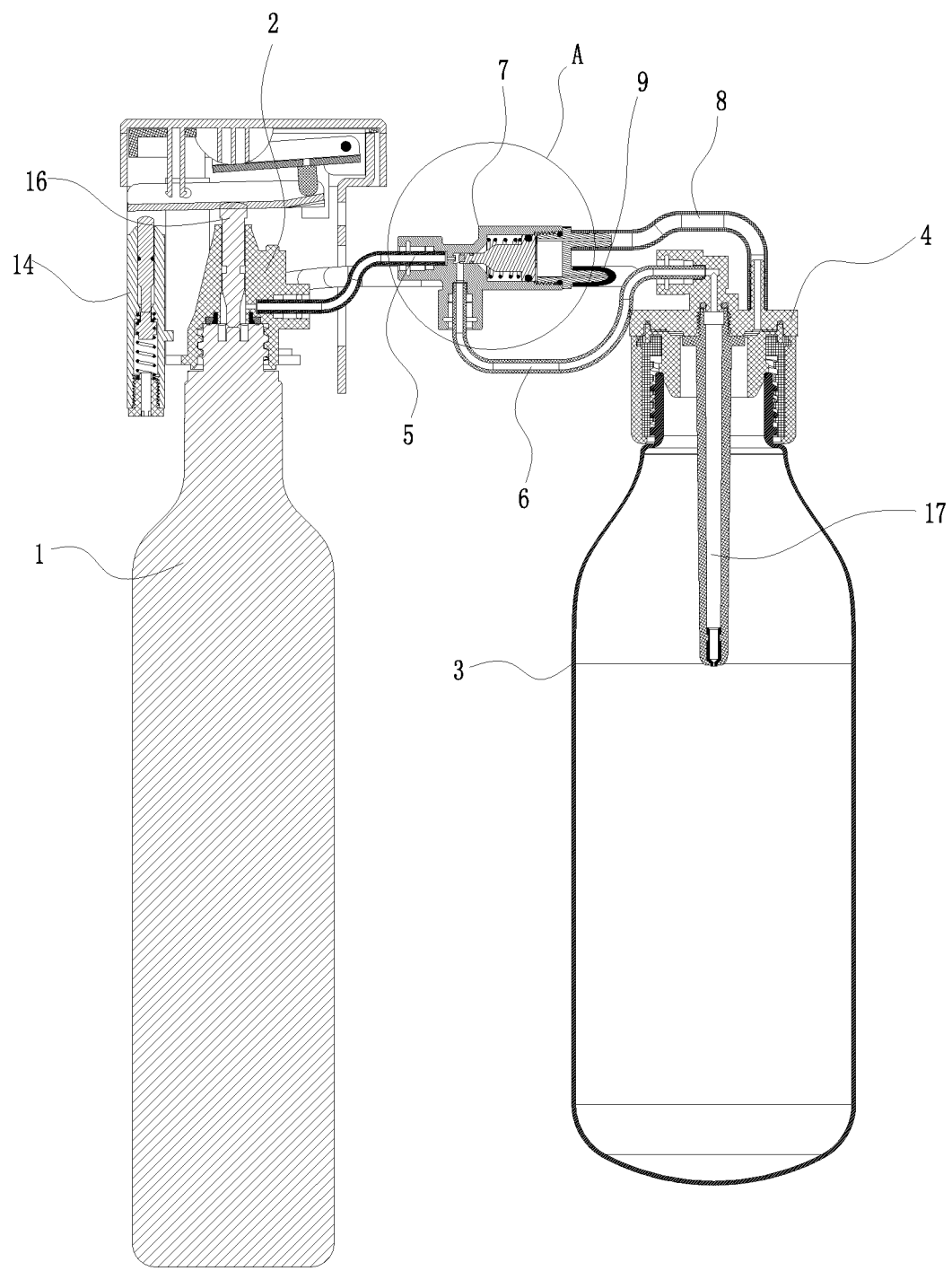
FIG. 1 is a cross-sectional view of the internal structure of the present invention.
Figure 2:
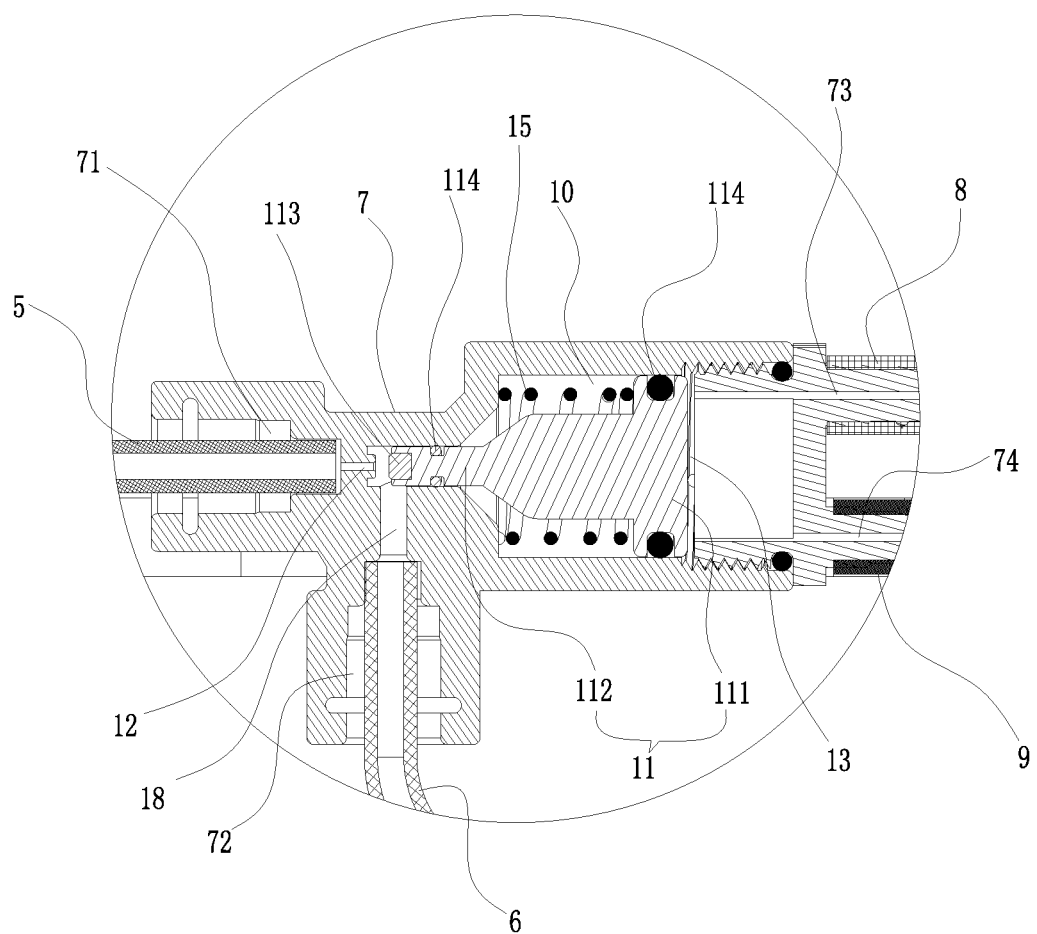
FIG. 2 is an enlarged view of circle A of FIG. 1.
Figure 3:
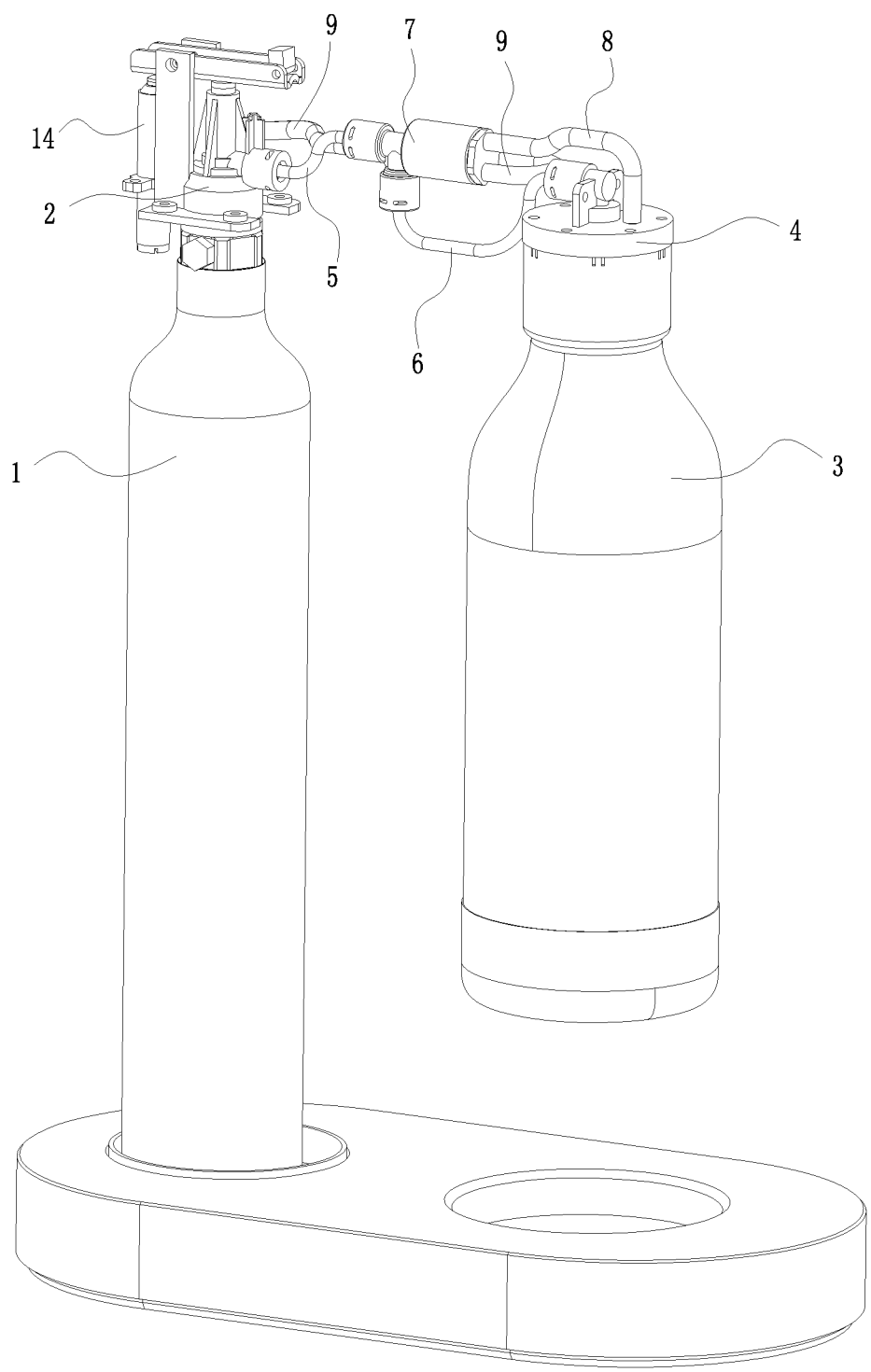
FIG. 3 is a perspective view of the present invention, omitting an external casing.
Figure 4:
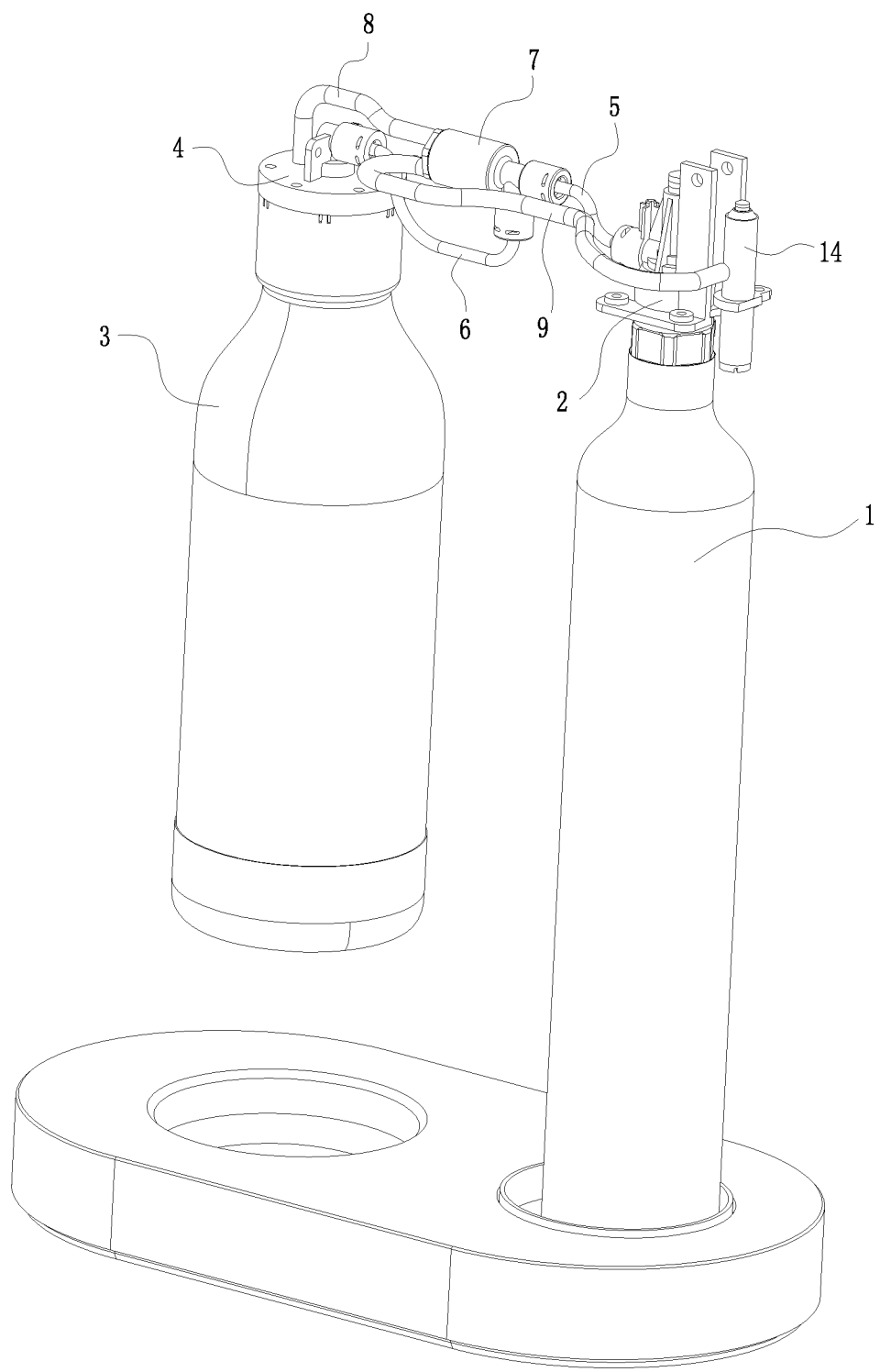
FIG. 4 is another perspective view of the present invention.

As shown in FIG. 1 through FIG. 4, the present invention discloses a sparkling water maker capable of automatically controlling gas inflow, comprising a gas cylinder 1, a gas cylinder connector 2 mounted on the gas cylinder 1, a bottle 3, and a bottle connector 4 mounted on the bottle 3. The bottle connector 4 is provided with a gas injection tube 17 extending downward to be inserted in a solution in the bottle 3. A gas guide tube is connected between the gas cylinder connector 2 and the bottle connector 4. The compressed gas in the gas cylinder 1 is delivered to the bottle 3 through the gas guide tube by pressing an ejector pin 16 disposed above the mouth of the gas cylinder 1. The gas guide tube includes a first gas guide tube 5 connected to the gas cylinder connector 2 and a second gas guide tube 6 connected to the bottle connector 4. A valve 7 is connected between the first gas guide tube 5 and the second gas guide tube 6. The valve 7 is configured to block a flow passage 18 between the first gas guide tube 5 and the second gas guide tube 6. The valve 7 has a plurality of openings 71, 72, 73, 74 connected to the first gas guide tube 5, the second gas guide tube 6, a first pressure relief tube 8 and a second pressure relief tube 9, respectively. The other end of the first pressure relief tube 8 is connected to the bottle connector 4 and is in communication with the bottle 3. The valve 7 has a chamber 10 therein and a movable member that is movable in the chamber 10. The movable member is configured to block the first gas guide tube 5 or the first pressure relief tube 8. When the pressure at an outlet of the first gas guide tube 5 is greater than the pressure at an outlet of the first pressure relief tube 8, the movable member blocks the first pressure relief tube 8. At this time, the sparkling water maker can perform carbonation. When the gas in the bottle 3 is saturated and the pressure at the outlet of the first pressure relief tube 8 is greater than the pressure at the outlet of the first gas guide tube 5, the movable member blocks the first gas guide tube 5. At this time, the sparkling water maker cannot continue to perform carbonation.

Furthermore, the valve 7 further includes a first passage 12 and a second passage 13. The first passage 12 and the second passage 13 communicate with the chamber 10. The first passage 12 is connected to the first gas guide tube 5 and the second gas guide tube 6. The second passage 13 is connected to the first pressure relief tube 8. A piston 11 is provided in the chamber 10. Two ends of the piston 11 have different cross-sectional areas, defined as a round block 111 and a round rod 112, respectively. A reducer union is connected between the round rod 112 and the round block 111. The cross-sectional area of the round rod 112 is less than the cross-sectional area of the round block 111. The round rod 112 is close to the first gas guide tube 5. The round block 111 is close to the first pressure relief tube 8. The piston 11 is configured to block the first passage 12 or the second passage 13. When the pressure in the first passage 12 is greater than the pressure in the second passage 13, the piston 11 blocks the second passage 13 under pressure; when the pressure in the second passage 13 is greater than the pressure in the first passage 12, the piston 11 blocks the first passage 12 under pressure.

Furthermore, one end of the second pressure relief tube 9 is connected to the second passage 13, and the other end of the second pressure relief tube 9 is connected to a pressure relief valve 14. When the pressure in the second pressure relief tube 9 is greater than the preset pressure of the pressure relief valve 14, the pressure relief valve 14 is opened to exhaust the gas to the outside of the sparkling water maker.

In order to maintain the airtightness, a sealing block 113 is provided at the end of the round rod 112, and sealing rings 114 are provided on the round rod 112 and the round block 111. The sealing rings 114 are in interference fit with the inner wall of the chamber 10.

A compression spring 15 is provided in the chamber 10. Two ends of the compression spring 15 abut against the round block 111 and the end face of the chamber 10 close to the first gas guide tube 5, respectively. In the initial state, the compression spring 15 drives the piston 11 to move toward the second gas guide tube 6.

In this embodiment, the gas pressure of the carbon dioxide gas in the gas cylinder 1 is about 0.6 MPa, and the saturation pressure of the bottle 3 is 6 bar. When the gas valve used for controlling the carbon dioxide gas is opened, the carbon dioxide gas pushes the piston 11 rightward and flows into the bottle 3 for performing carbonation, and the gas enters the end having the round block 111 of the piston 11 through the bottle 3. Using the different cross-sectional areas of the two ends of the piston 11, when the when the pressure in the bottle 3 reaches the required 6 bar, the piston 11 is moved leftward to shut off the gas, so as to keep the pressure in the bottle 3 at the required 6 bar. When the gas is released, the pressure relief valve opens to exhaust the excess gas in the bottle 3, so that the carbon dioxide gas is fully utilized, there will be no unnecessary waste, and the gas pressure in the bottle 3 is always maintained at about 6 bar. It is safer for use.

What is claimed is:

1. A sparkling water maker, comprising a gas cylinder, a gas cylinder connector mounted on the gas cylinder, a bottle and a bottle connector mounted on the bottle; a gas guide tube being connected between the gas cylinder connector and the bottle connector, a compressed gas in the gas cylinder being delivered to the bottle through the gas guide tube; the gas guide tube including a first gas guide tube connected to the gas cylinder connector and a second gas guide tube connected to the bottle connector, a valve being connected between the first gas guide tube and the second gas guide tube, the valve being configured to block a flow passage between the first gas guide tube and the second gas guide tube, wherein the valve has a plurality of openings respectively connected to the first gas guide tube, the second gas guide tube and one end of a first pressure relief tube, another end of the first pressure relief tube is connected to the bottle connector and is in communication with the bottle, the valve has a chamber therein and a movable member that is movable in the chamber, the movable member is configured to block the first gas guide tube or the first pressure relief tube, when the pressure at an outlet of the first gas guide tube is greater than the pressure at an outlet of the first pressure relief tube, the movable member blocks the first pressure relief tube, so that the sparkling water maker can perform carbonation; when the gas in the bottle is saturated and the pressure at the outlet of the first pressure relief tube is greater than the pressure at the outlet of the first gas guide tube, the movable member blocks the first gas guide tube, so that the sparkling water maker cannot continue to perform carbonation.

2. The sparkling water maker as claimed in claim 1, wherein the valve further includes a first passage and a second passage, the first passage and the second passage communicate with the chamber, the first passage is connected to the first gas guide tube and the second gas guide tube, the second passage is connected to the first pressure relief tube, the movable member is configured to block the first passage or the second passage, when the pressure in the first passage is greater than the pressure in the second passage, the movable member blocks the second passage under pressure; when the pressure in the second passage is greater than the pressure in the first passage, the movable member blocks the first passage under pressure.

3. The sparkling water maker as claimed in claim 1, wherein the valve is further connected with a second pressure relief tube, one end of the second pressure relief tube is connected to the second passage, another end of the second pressure relief tube is connected to a pressure relief valve, when the pressure in the second pressure relief tube is greater than a preset pressure of the pressure relief valve, the pressure relief valve is opened to exhaust the gas to an outside of the sparkling water maker.

4. The sparkling water maker as claimed in claim 2, wherein the movable member is a piston, two ends of the piston have different cross-sectional areas, and the cross-sectional area of one end close to the first gas guide tube of the piston is less than the cross-sectional area of the other end close to the second gas guide tube of the piston.

5. The sparkling water maker as claimed in claim 4, wherein the piston includes a round block and a round rod, the round rod is close to the first gas guide tube, the round block is close to the first pressure relief tube, and the round rod has a cross-sectional area less than that of the round block.

6. The sparkling water maker as claimed in claim 5, wherein a sealing block is provided at one end of the round rod, sealing rings are provided on the round rod and the round block respectively, and the sealing rings are in interference fit with an inner wall of the chamber.

7. The sparkling water maker as claimed in claim 5, wherein a compression spring is provided in the chamber, two ends of the compression spring abut against the round block and an end face of the chamber close to the first gas guide tube respectively, in an initial state, the compression spring drives the piston to move toward the second gas guide tube.

* * * * *